(12) United States Patent
Austin et al.

(10) Patent No.: US 6,709,700 B1
(45) Date of Patent: Mar. 23, 2004

(54) PROCESS ASSEMBLY UTILIZING FIXTURING MADE OF AN OPEN-CELL CERAMIC SOLID FOAM, AND ITS USE

(75) Inventors: Curtiss Mitchell Austin, Loveland, OH (US); Richard John Grylls, Loveland, OH (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 09/709,009

(22) Filed: Nov. 8, 2000

(51) Int. Cl.[7] .............................. B05D 5/00; B05D 3/02
(52) U.S. Cl. .................... 427/243; 264/42; 427/314
(58) Field of Search .................... 427/243, 314; 264/42, 29.1, 29.7

(56) References Cited

U.S. PATENT DOCUMENTS

| | | | |
|---|---|---|---|
| 4,375,233 A | | 3/1983 | Rossmann et al. |
| 4,526,826 A | * | 7/1985 | Ten Eyck et al. |
| 4,564,496 A | * | 1/1986 | Gupta et al. |
| 4,673,435 A | | 6/1987 | Yamaguchi et al. ......... 75/235 |
| 5,011,063 A | | 4/1991 | Claar |
| 5,061,660 A | | 10/1991 | Park et al. |
| 5,214,011 A | | 5/1993 | Breslin .................. 501/127 |
| 5,308,422 A | | 5/1994 | Askay et al. |
| 5,503,213 A | | 4/1996 | Pyzik et al. |
| 5,518,061 A | | 5/1996 | Newkirk et al. .............. 164/97 |
| 5,728,638 A | | 3/1998 | Strange et al. .............. 501/127 |

OTHER PUBLICATIONS

J. Ringnald et al., "Scanning and Transmission Electron Microscopy on Composite Materials prepared by SMP and In–Situ Displacive Reactions," *Inst.Phys.Conf.Ser.* No. 147, Section 13, pp. 571 et seq. (1995).

Nine page printout from Internet page of BFD, Inc, www.f-bd-inc.com, printed Apr. 24, 2000.

* cited by examiner

*Primary Examiner*—Christopher A. Fiorilla
(74) *Attorney, Agent, or Firm*—Gregory O. Garmoug; Carmen Santa Maria; McNess Wallace & Nurick LLC

(57) ABSTRACT

A sacrificial ceramic fixture precursor is furnished with a shaped portion thereof shaped to receive a supported article. The sacrificial ceramic fixture precursor is immersed into a molten reactive metal for a period of time sufficient to permit the sacrificial ceramic fixture precursor and the reactive metal to react together. The result is a reacted ceramic fixture comprising an open-cell solid foam of ceramic cell walls having an interconnected intracellular volume therebetween. The reacted ceramic fixture is contacted to a supported article to produce a process assembly. The process assembly is processed as required for the supported article, which typically includes heating to an elevated temperature.

20 Claims, 3 Drawing Sheets

PROCESS ASSEMBLY UTILIZING FIXTURING MADE OF AN OPEN-CELL CERAMIC SOLID FOAM, AND ITS USE

FIELD OF THE INVENTION

This invention relates to a process assembly including the fixturing that is used to support an article in a process application, and, more particularly, to such fixturing made of an opencell ceramic solid foam.

BACKGROUND OF THE INVENTION

Fixturing, also sometimes termed tooling, is required in many processes to support articles that are being processed. Typically, the fixture is positioned in relation to the supported article so as to retain spatial and dimensional relations. For example, the supported article may include two components that must be positioned precisely relative to each other during the course of the processing, and the fixture achieves and maintains that relation. In another example, the supported article includes only a single component that is supported over a wide area to prevent sagging and other dimensional changes during processing at elevated temperature. There are many other examples of the use of fixtures in manufacturing technology. Some fixtures are used only a single time, and other fixtures are designed to be reused many times before being refurbished or replaced.

The fixture for each particular manufacturing operation is often costly to produce, because it must correspond to exacting requirements of the supported article. Fixtures are required in order to produce operable final products in many cases. They are therefore an expensive but necessary part of the manufacturing operations.

High-temperature mechanical properties and wear resistance are often the limiting factors in the operability and life of a fixture. For a fixture that is to be used in elevated-temperature processing of the supported article, the fixture must retain sufficient strength at the elevated temperature so that the required geometrical relations are retained. For a fixture that is to be reused many times, the wearing action of the supported article on the fixture causes the dimensions of the fixture to change slightly, so that after several re-uses the required dimensional relations may no longer be retained.

Fixtures are made of a wide variety of materials according to the specific requirements of the supported article and the processing in which the fixtures are to be used. Many fixtures are made of metal because it is readily machined to shape, and some fixtures are made of other materials such as ceramic because it has good strength properties at elevated temperature and is wear resistant. Metal fixturing has the disadvantages that it loses strength at moderately elevated temperatures and often has low wear resistance. Available types of ceramic fixturing have the disadvantages that they are difficult and expensive to produce to exacting tolerances.

There is a need for an improved approach to the fabrication of fixturing, particularly used in process applications requiring heating to elevated temperatures. The present invention fulfills this need, and further provides related advantages.

BRIEF SUMMARY OF THE INVENTION

The present invention provides a method for processing a supported article that requires support from a fixture during the processing, and particularly provides the fixture that is used in the processing. The fixture is fully compatible with a wide variety of manufacturing processes for a wide variety of supported articles. The fixture has excellent mechanical properties at elevated temperatures. There is little change of dimensions when the temperature of the fixture is changed over wide ranges. The fixture is also highly wear resistant, so that it may be used in multiple repetitions of the manufacturing operation. The fixture is readily prepared to precise tolerances by a relatively inexpensive procedure.

A method for processing a supported article that requires support from a fixture during the processing comprises the steps of fishing a sacrificial ceramic fixture precursor having a shaped portion thereof shaped to receive a supported article in contact therewith, and thereafter contacting the sacrificial ceramic fixture precursor to a molten reactive metal for a period of time sufficient to permit the sacrificial ceramic fixture precursor and the reactive metal to react together. The result is a reacted ceramic fixture, having the shape and dimensions required in the final fixture, comprising an open-cell solid foam of ceramic cell walls having an interconnected intracellular volume therebetween. The method further includes positioning the reacted ceramic fixture in relation to the supported article to produce a process assembly, and thereafter processing the process assembly as required for the supported article.

The sacrificial ceramic fixture precursor is preferably silica, and the reactive metal is preferably an aluminum-based metal. The resulting solid foam has alumina cell walls. Preferably, the ceramic cell walls comprise more than about 60 percent by volume, and most preferably from about 60 to about 80 percent by volume, of the open-cell solid foam.

The sacrificial ceramic fixture precursor is preferably provided by slip casting the sacrificial ceramic fixture precursor from a sacrificial ceramic slip material comprising particles of the sacrificial ceramic, and thereafter drying and firing the sacrificial ceramic fixture percursor. One advantage of the present approach is that the shape and dimensions of the sacrificial ceramic fixture precursor change very little during the contacting step. However, if there is some minor change, it may be easily corrected in the event that the sacrificial ceramic has a softening temperature. In that case, prior to the contacting step the sacrificial ceramic fixture precursor made of the sacrificial ceramic is heated to a temperature above the softening temperature, and the dimensions of the sacrificial ceramic fixture precursor are corrected while it is at a temperature above the softening temperature.

In one embodiment, after the step of contacting and before the step of supporting, metal is removed from at least a portion of the intrcellular volume of the reacted ceramic fixture to produce porosity therein. The porosity may be left as-is. Alternatively, at least some of the porosity may be filled with a filler material such as a filler metal or a surface sealant.

In a typical application, the supported article comprises a nickel-base superalloy. In positioning, the reacted ceramic fixture is usually, but not necessarily, contacted to the supported article. The processing involves heating the process assembly, including the fixture and the supported article, to a temperature greater than room temperature.

The process assembly of the present approach thus comprises a fixture having a body with a shaped portion thereof shaped to receive a supported article in contact therewith. The body comprises an open-cell solid foam of ceramic cell walls having an interconnected intracellular volume therebetween. A supported article is in contact with the shaped portion of the fixture body.

The present approach provides a method for processing a supported article using a ceramic or ceramic/metal fixture that has excellent properties over a wide temperature range, is dimensionally stable over a wide temperature range, and has excellent wear resistance. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
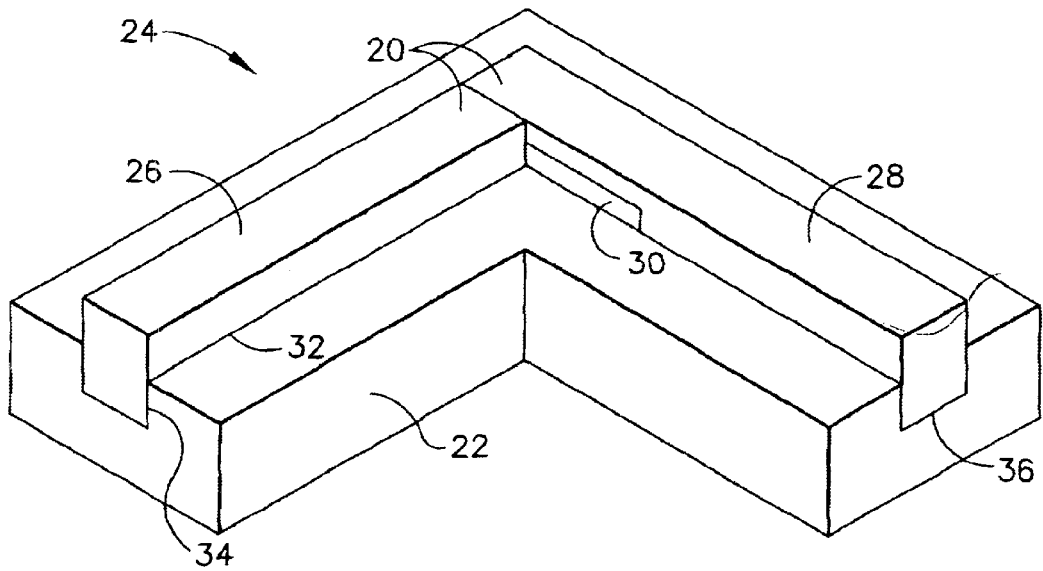
FIG. 1 is a perspective view of a fixture and supported article.

FIG. 1 depicts an example of an application where a supported article 20 is positioned by a fixture 22 to form a process assembly 24. In this example, the supported article 20 includes a first piece 26 and a second piece 28 that are to be joined by brazing along an interface 30. The brazing operation requires that the positioning of the pieces 26 and 28 to form the interface 30 be maintained to good accuracy over a temperature range of room temperature to the brazing temperature that may be well in excess of 1500° F. The fixture 22 therefore has an L-shaped (when viewed from above) channel 32 whose ends 34 and 36 are visible at the opposite ends of the fixture 22. The first piece 26 and the second piece 28 rest in the channel 32 positioned to form the interface 30, with a thin layer of braze material (not visible in the figure due to its thin dimension) therebetween at the interface 30. Another similar L-shaped fixture may be placed overlying this assembly if desired to completely enclose the first piece 26 and the second piece 28.

The illustrated process assembly 24 using the fixture 22 is provided as an illustration of the use of fixturing which benefits by employing the present invention. It is not limiting of the invention or of the applications of the present invention.

Figure 2:
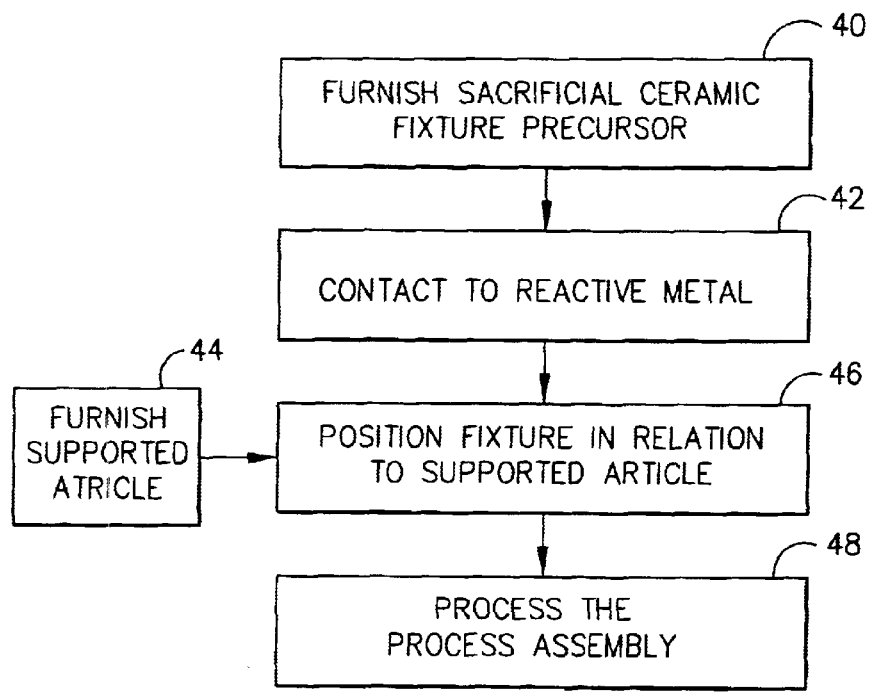
FIG. 2 is a block flow diagram of a method for practicing the invention.

FIG. 2 illustrates a method for practicing the invention with a supported article that requires support from a fixture during its processing. A sacrificial ceramic fixture precursor having a shaped portion thereof shaped to receive a supported article in contact therewith is furnished, numeral 40. In the illustrated case of FIG. 1, the fixture precursor has the shape of the fixture 22, with the L-shaped channel 32.

The fixture precursor is a sacrificial ceramic that is subsequently reacted with a reactive metal, as will be discussed subsequently. The sacrificial ceramic is preferably silica (silicon dioxide, $SiO_2$).

Figure 3:
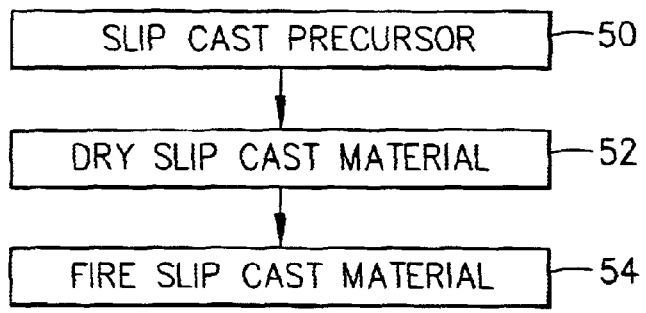
FIG. 3 is a block flow diagram of a method for furnishing the sacrificial ceramic fixture precursor.

The fixture precursor may be made by any operable approach. In a preferred technique illustrated in FIG. 3, the fixture precursor is prepared by slip casting. A mold is prepared having the inverse (negative) of the final fixture 22, but of slightly larger dimensions. In this preferred approach, a slip of a sacrificial ceramic material is prepared and cast into the mold, numeral 52. The preferred sacrificial ceramic material is silica. Additions of modifiers may be made to the ceramic slip. For example, additions that modify the firing behavior of the ceramic, such as calcia (calcium oxide) in the case of silica sacrificial ceramic, may be made. Additions that modify the porosity of the final reacted ceramic material, such as mullite, may be made. Additions that modify the properties of the final reacted ceramic material, such as boron nitride to increase the wear resistance of the final reacted ceramic material, may be made. Additions that modify the chemical composition of the final reacted ceramic, such as boron, may be made.

The slip casting of silica particles is well known in other applications, and the same procedures are used here. Typically, a slurry of silica particles and acrylic binder in water is prepared and poured into the mold, step 50. The mold and its contents are dried, numeral 52, to remove the carrier liquid. The dried slip cast material is thereafter heated to an elevated temperature to fire and fuse the ceramic, numeral 54. In the case of silica, a typical firing temperature is about 2000° F. and a firing time is about 4 hours. The original slip casting was made slightly oversize to account for the shrinkage during drying and firing. The required oversize is known in the art because slip casting is so widely employed for other applications, but is typically about 1–15 percent.

Other operable techniques to furnish the central core precursor, may be used as well. The central core precursor may be transfer molded or injection molded (collectively termed "molded"), for example. In these techniques, the sacrificial ceramic powder may be mixed with a plasticizer and/or other process aids and forced into a cavity that defines the desired shape.

Figure 4:
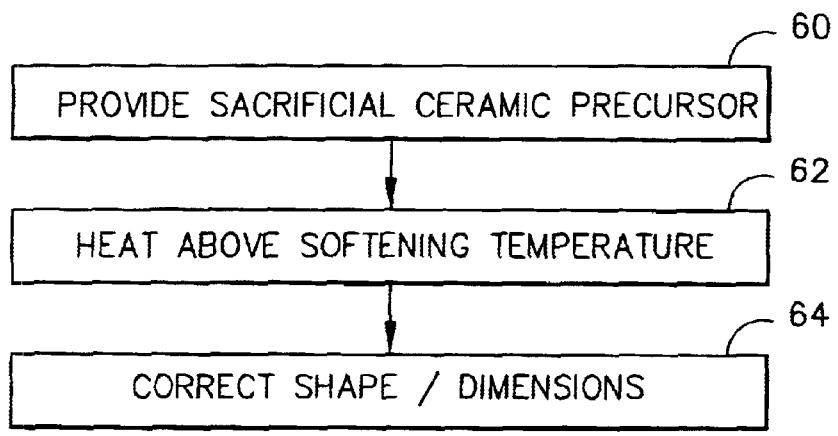
FIG. 4 is a block flow diagram of a method for correcting the shape and dimensions of the sacrificial ceramic fixture precursor.

Once the basic sacrificial ceramic fixture precursor is prepared, it may optionally be processed to correct its shape or dimensions. One technique that produces particularly useful results is illustrated in FIG. 4. Although the preparation technique normally produces a fixture precursor that is close to the required shape and dimensions of the fixture 22, there may be some variation which may be corrected by the approach discussed next The sacrificial ceramic precursor is provided, numeral 60, by any operable technique such as that of FIG. 3. In the case of a silica sacrificial ceramic and some other ceramics, the sacrificial ceramic has a softening temperature at which it softens and may be deformed without breaking. Such a sacrificial ceramic is heated above its softening temperature, numeral 62. While at a temperature above the softening temperature so that it is in the deformable state, the shape and/or dimensions of the sacrificial ceramic are corrected by the use of a form, a die, or other operable approach, numeral 64. The correction of the sacrificial ceramic may include other changes such as modifying the surface to roughen or smooth the surface as may be required for particular fixturing applications. Roughening may be accomplished by pressing a tool with the desired pattern of roughness against the surface of the heated fixture precursor. Smoothing may be accomplished by passing a flat tool over roughness already on the surface of the fixture precursor or by other operable approach.

The shape or dimensions may instead be altered or corrected as necessary by machining or other reshaping operation performed on either the sacrificial ceramic form or the reacted ceramic fixture prior to use in processing the process assembly. Such coarse or fine machining or other reshaping operations may occur, for example, after steps 40, 42, 70, 72, or 74, or at any other appropriate time prior to step 46.

Returning to FIG. 2, the sacrificial ceramic fixture precursor is contacted to a molten reactive metal, numeral 42, for a period of time sufficient to permit the sacrificial ceramic fixture precursor and the reactive metal to react together. The contacting is preferably accomplished by immersing the sacrificial ceramic fixture precursor into the molten reactive metal. The contacting may instead be accomplished by other techniques, such as floating the sacrificial ceramic fixture precursor on the molten metal so that only a portion of surface of the sacrificial ceramic fixture precursor is reacted. The molten reactive metal preferably is at a reaction temperature of at least about 300° C. above its melting point, and most preferably is at a reaction temperature of about 1100–1300° C. in the case of the preferred aluminum-base metal. The reaction time is as needed for the thickness of the fixture, but is typically about 8hours. In the preferred case where the sacrificial ceramic fixture precursor is silica, the reactive metal is an aluminum-base metal. The preferred approach is disclosed in U.S. Pat. Nos. 5,214,011 and 5,728,638, whose disclosures are incorporated by reference. The metal may be a pure metal, or it may be an alloy containing the reactive metal. Most preferably, the reactive metal, when in alloy form, contains more of the reactive element than any other element. The reactive metal may optionally be mixed with nonreactive metals such as a large fraction of nickel and other elements of the nickel-base alloy of interest for some applications, as disclosed in the '638 patent.

While the sacrificial ceramic form is contacted to the reactive metal, the ceramic of the sacrificial ceramic from is chemically reduced and the reactive metal is chemically oxidized. (Reduction and oxidation are broadly interpreted in the sense of electron transfer.) The reactive metal becomes an oxide or oxidized form, alumina in the preferred case. As a result of a mechanism involving volume changes and internal fracturing and discussed in the '011 patent, the foam or sponge structure is formed throughout the sacrificial ceramic as it transforms form the sacrifical from-composition to the final composition. The intracellular volume that result s filled with the metal resulting from the reaction process. The result of the contacting step 42 is a reacted ceramic fixture.

Figure 7:
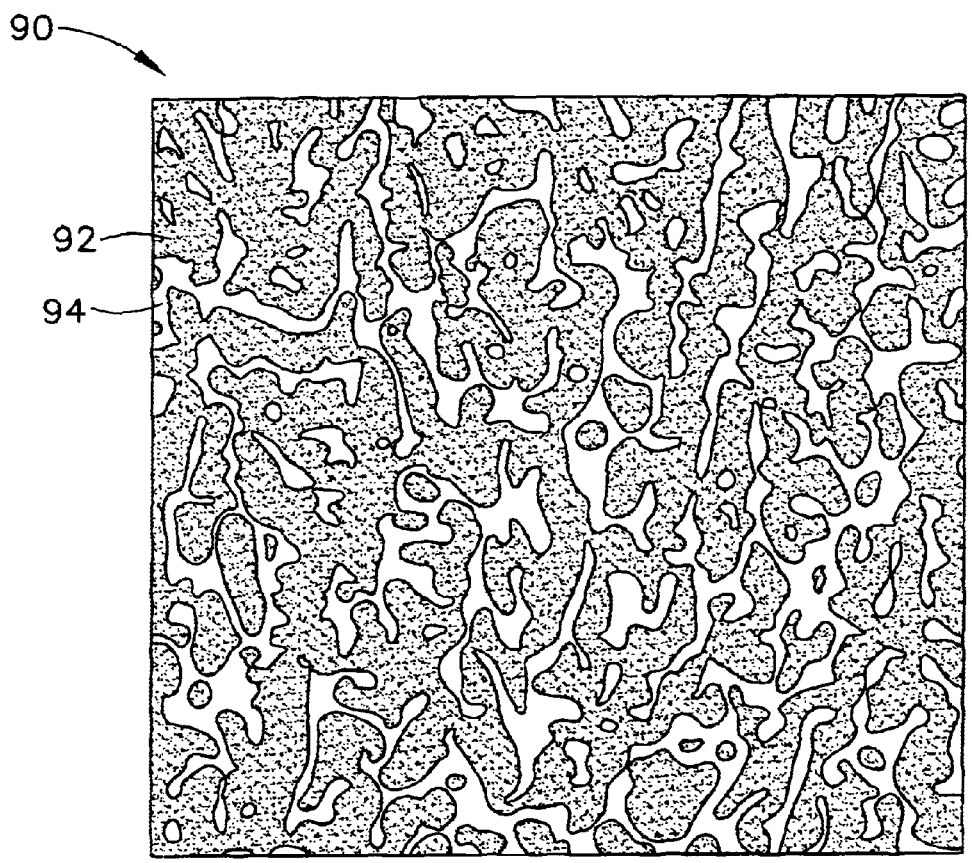
FIG. 7 is an idealized microstructure of an open-cell foam.

An example of the foam material is shown in FIG. 7. The open-cell solid foam material 90 comprises two interpenetrating, continuous regions 92 and 94. The region 92 is cell walls formed of a ceramic reaction product of the reaction between the sacrificial ceramic and the reactive metal. The intracellular region 94 is a metallic material. In the preferred case where the sacrificial ceramic is silica and the reactive metal is an aluminum-base metal, the region 92 is alumina (plus any modifiers that were added to the original sacrificial ceramic and remain). The intracellular region 94 is an aluminum-base metal that is also a reaction product but will, in general, have a different composition than that of the initial reactive metal. The region 92 preferably occupies at least 60 percent by volume of the foam material 90, preferably from about 60 to about 80 percent by volume of the foam material 90. The intracellular region 94 occupies the remainder of the foam material 90.

The region 92 is internally continuous within itself, and the intracellular region 94 is internally continuous within itself. A consequence of this structure is that either of the regions 92 or 94 may be removed in whole or in part to produce internal porosity within the foam material 90. The remaining region has a continuous, self-supporting structure which maintains its physical integrity and thence causes the foam material 90 to have the outward appearance and function of a solid body. Thus, for example, the metal of the intracellular region 94 may optionally be removed in part or in its entirety, and the remaining region 92 is a continuous skeletal ceramic structure. (The ceramic region 92 could instead be removed to leave a metallic skeleton, but the ceramic skeleton is desired for most purposes.)

Figure 5:
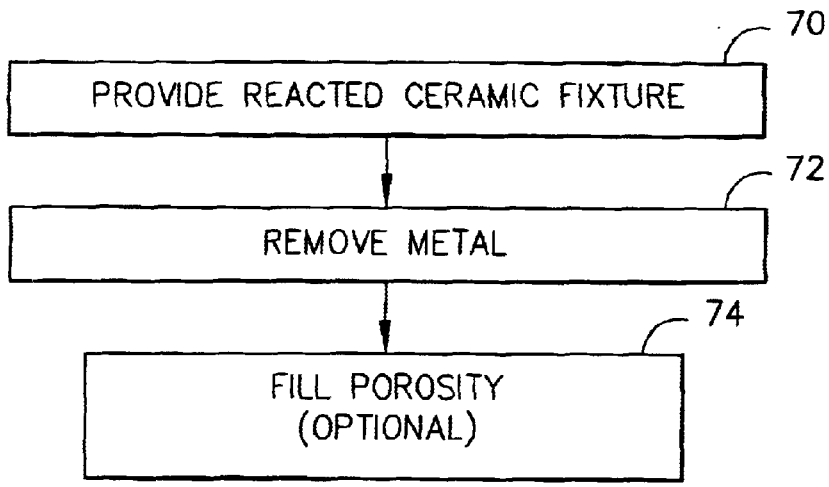
FIG. 5 is a block flow diagram of a method for removing metal and filling the resulting porosity in the sacrificial ceramic fixture precursor.

The approach is illustrated in FIG. 5. The reacted ceramic fixture is provided, numeral 70. Metal is removed from the intracellular region 94, numeral 72. The technique for removing the metallic phase in the intracellular region 94 will vary according to the composition of the metal. In the preferred case, all or part of the aluminum-base metal may be chemically removed by dissolution in an appropriate chemical. For example, aluminum-base metals may be removed by reaction with HCl or NaOH.

The result of removing metal is that some or all of the intracellular volume 94 is porosity. The porosity may be left undisturbed without further changes. The presence of the porosity makes the tooling more resistant to cracking and failure during rapid temperature changes during later service. Leaving the porosity as-is may be desirable for applications where the fixture is required to be heated or cooled rapidly in later steps.

The porosity may instead be filled or partially filled with a filler material, numeral 74, although this filling may be very difficult to accomplish in some cases. This approach is possible because the region 94 is continuously connected. The filler material may be a filler metal such as another alloy that is infiltrated into the porosity to modify the properties of the fixture 22. For example, a nickel-base superalloy or a copper alloy may be infiltrated into the porosity. The molten filler metal may be infiltrated into the porosity under gravity, or with a vacuum or pressure applied to accelerate the infiltration. The filler material may be a non-metal such as a ceramic surface sealant. The porosity at the surface of the reacted ceramic fixture from which metal has been removed renders the surface somewhat rough, which may be desirable for some fixturing applications. In other applications, the rough surface is undesirable. The rough surface may be smoothed by applying a ceramic paste, such as a paste of alumina particles, to the surface, and thereafter drying the paste and sintering the alumina particles together. In an example wherein the ceramic cell walls are alumina, the surface porosity may be coated with an alumina paste and then fired at a temperature of about 2800° F. for a time of about 8 hours. This produces a thin, smooth layer of ceramic at the surface, but the interior remains unchanged.

Figure 6:
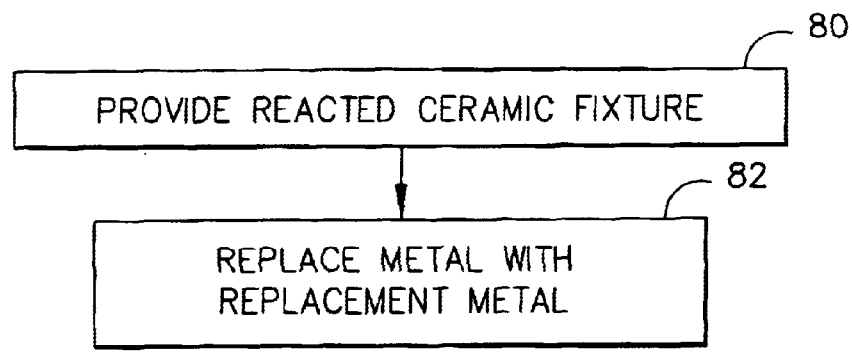
FIG. 6 is a block flow diagram of a method for replacing metal in the sacrificial ceramic fixture precursor.

The metal within the intracellular region 94 may also be replaced with another metal by a direct chemical reaction. As illustrated in FIG. 6, the reacted ceramic fixture is provided, numeral 80. The metal in the intracellular region 94 is replaced with a replacement metal, numeral 82. For example, portions of the aluminum metal may be replaced by contacting the aluminum/aluminum oxide composite material with a bath of the replacement liquid metal, such as a nickel-base or copper-base alloy. The composite material is maintained in the replacement liquid metal for a period of time, which depends upon the thickness of the composite material. This contacting allows diffusion to take place such that the aluminum is replaced by the liquid replacement metal from the bath. As an example, the aluminum/ aluminum oxide composite material may be contacted to a nickel-base alloy for 8 hours at 1600° C. to effect the substantially complete replacement of the aluminum phase by the nickel-base alloy.

All of the techniques described in relation to FIGS. 4–6 are used to tailor the fixture 22 for the specific fixturing application.

Returning to the discussion of FIG. 2, the supported article is furnished, numeral 44. In the case of FIG. 1, the supported article 20 is finished. The supported article is prepared separately by techniques known in the art for each specific supported article and furnished. The specific procedures in the preparation of the supported article is not a part of the present invention. The supported articles of most interest to the present inventors are made of nickel-base superalloys. For example, "nickel" includes pure nickel and nickel-base alloys. As used herein, "metal-base" means that the composition has more of the named metal present than any other element. For example, a nickel-base alloy has more nickel than any other element. The nickel-base alloy may additionally be a nickel-base superalloy, meaning that it is of a composition which is strengthened by the precipitation of gamma-prime phase. A typical nickel-base alloy has a composition, in weight percent, of from about 1 to about 25 percent cobalt, from about 1 to about 25 percent chromium, from about 0 to about 8 percent aluminum, from 0 to about 10 percent molybdenum, from about 0 to about 12 percent tungsten, from about 0 to about 12 percent tantalum, from 0 to about 5 percent titanium, from 0 to about 7 percent rhenium, from 0 to about 6 percent ruthenium, from 0 to about 4 percent niobium, from 0 to about 0.2 percent carbon, from 0 to about 0.15 percent boron, from 0 to about 0.05 percent yttrium, from 0 to about 1.6 percent hafnium, balance nickel and incidental impurities.

The fixture is positioned in relation to the supported article, numeral 46, to form the process assembly (assembly 24 in FIG. 1). The positioning depends upon the specific fixturing application. For example, in the process assembly of FIG. 1, the two pieces 26 and 28 are placed into the channel 32 of the fixture 22 so that the two pieces 26 and 28 contact the fixture 22, in the appropriate manner to form the interface 30 with the brazing material therebetween Because of the wide variety of fixturing applications, many different approaches are used to position the fixturing in relation to the supported article(s), and the proper approach will be apparent from each application. In some cases, the fixture does not contact the supported article, but accomplishes its purpose through intermediate structure.

The process assembly is processed as required for the support article, numeral 48. In the example of FIG. 1, the process assembly 24 is heated to the brazing temperature, whereupon the braze material reflows, and then the process assembly 24 is cooled back to room temperature to solidify the braze material and form the braze joint. There are a wide variety of processing approaches, with the present invention applicable to each one.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for processing a supported article that requires support from a fixture during the processing, comprising the steps of:

furnishing a sacrificial ceramic fixture precursor having a shaped portion thereof shaped to receive a supported article in contact therewith, wherein the supported article comprises a nickel-base superalloy; thereafter contacting the sacrificial ceramic fixture precursor to a molten reactive metal for a period of time sufficient to permit the sacrificial ceramic fixture precursor and the reactive metal to react together, producing a reacted ceramic fixture comprising an open-cell solid foam of ceramic cell walls having an interconnected intracellular volume therebetween; thereafter positioning the reacted ceramic fixture in relation to the supported article to produce a process assembly; and thereafter processing the process assembly as required for the supported article.

2. The method of claim 1, including an additional step, after the step of contacting and before the step of supporting, of removing metal from at least a portion of the intracellular volume of the reacted ceramic fixture to produce porosity therein.

3. The method of claim 2, including an additional step, after the step of removing and before the step of positioning, of filling at least some of the porosity with a filler material.

4. The method of claim 3, wherein the filler material is a filler metal.

5. The method of claim 3, wherein the filler material is a ceramic surface sealant.

6. The method of claim 1, including an additional step, after the step of contacting and before the step of supporting, of replacing metal in at least a portion of the intracellular volume of the reacted ceramic fixture with a replacement metal.

7. The method of claim 1, wherein the sacrificial ceramic fixture precursor comprises silica.

8. The method of claim 1, wherein the ceramic cell walls comprise from about 60 to about 80 percent by volume of the open-cell solid foam.

9. The method of claim 1, wherein the molten reactive metal comprises an aluminum-base metal.

10. The method of claim 1, wherein the step of furnishing a sacrificial ceramic fixture precursor includes the step of slip casting the sacrificial ceramic fixture precursor from a sacrificial ceramic slip material comprising particles of the sacrificial ceramic.

11. The method of claim 1, wherein the step of finishing includes the steps of preparing the sacrificial ceramic fixture precursor of a sacrificial ceramic having a softening temperature, heating the sacrificial ceramic fixture precursor made of the sacrificial ceramic to a temperature above the softening temperature, and correcting the dimensions of the sacrificial ceramic fixture precursor while it is at a temperature above the softening temperature.

12. The method of claim 1, wherein the step of furnishing includes the step of correcting the dimensions of the sacrificial ceramic fixture precursor.

13. The method of claim 1, wherein the step of processing includes the step of heating the process assembly to a temperature greater than room temperature.

14. The method of claim 1, wherein the step of positioning includes the step of contacting the reacted ceramic fixture to the supported article.

15. A method for processing a supported article that requires support from a fixture during the processing, comprising the steps of:

furnishing a sacrificial ceramic fixture precursor having a shaped portion thereof shaped to receive a supported article in contact therewith, wherein the step of furnishing includes the steps of preparing the sacrificial ceramic fixture precursor of a sacrificial ceramic having a softening temperature, heating the sacrificial ceramic fixture precursor made of the sacrificial ceramic to a temperature above the softening temperature, and correcting the dimensions of the sacrificial ceramic fixture precursor while it is at a temperature above the softening temperature; thereafter contacting the sacrificial ceramic fixture precursor to a molten reactive metal for a period of time sufficient to permit the sacrificial ceramic fixture precursor and the reactive metal to react together, producing a reacted ceramic fixture comprising an open-cell solid foam of ceramic cell walls having an interconnected intracellular volume therebetween; thereafter positioning the reacted ceramic fixture in relation to the supported article to produce a process assembly; and thereafter processing the process assembly as required for the supported article.

16. The method of claim 15, including an additional step, after the step of contacting and before the step of supporting, of removing metal from at least a portion of the intracellular volume of the reacted ceramic fixture to produce porosity therein.

17. The method of claim 16, including an additional step, after the step of removing and before the step of positioning, of filling at least some of the porosity with a filler material.

18. The method of claim 15, including an additional step, after the step of contacting and before the step of supporting, of replacing metal in at least a portion of the intracellular volume of the reacted ceramic fixture with a replacement metal.

19. The method of claim 15, wherein the sacrificial ceramic fixture percursor comprises silica.

20. The method of claim 15, wherein the molten reactive metal comprises an aluminum-base metal.

\* \* \* \* \*

UNITED STATES PATENT AND TRADEMARK OFFICE
CERTIFICATE OF CORRECTION

PATENT NO. : 6,709,700 B1
DATED : March 23, 2004
INVENTOR(S) : Austin et al.

It is certified that error appears in the above-identified patent and that said Letters Patent is hereby corrected as shown below:

Title page,
Item [56], References Cited, OTHER PUBLICATIONS,
"Nine page printout" reference, "www.f-bd-inc.com," should be -- www.bfd-inc.com --.
Item [74], *Attorney, Agent, or Firm*, "McNess" should be -- McNees --.

Column 2,
Line 50, "intrcellular" should be -- intracellular --.

Column 4,
Line 26, "2000° F." should be -- 2000° F --.
Line 47, "discussed next The sacrificial" should be -- discussed next. The sacrificial --.

Column 5,
Line 19, "C. above" should be -- C above --.
Line 20, "1100-1300° C. in" should be -- 1100-1300° C in --.
Line 23, "8hours." should be -- 8 hours. --.
Line 44, "as it transforms from the sacrifical from" should be -- as it transforms from the sacrificial form --.
Line 46, "result s filled" should be -- results is filled --.

Column 6,
Line 51, "2800° F." should be -- 2800° F --.

Column 7,
Line 42, "therebetween Because" should be -- therebetween. Because --.

Signed and Sealed this

Twenty-third Day of May, 2006

JON W. DUDAS
*Director of the United States Patent and Trademark Office*